(12) United States Patent
Hill et al.

(10) Patent No.: US 12,475,703 B2
(45) Date of Patent: Nov. 18, 2025

(54) KIOSK WITH OBJECT IDENTIFICATION, REGISTRATION, AND TRACKING CAPABILITIES WITH LIGHT AND/OR AUDIO GUIDANCE

(71) Applicant: Position Imaging, Inc., Portsmouth, NH (US)

(72) Inventors: Edward L. Hill, Conway, NH (US); Brian Martel, Farmington, NH (US); Liisa Walsh, Hampton, NH (US)

(73) Assignee: Position Imaging, Inc., Portsmouth, NH (US)

( * ) Notice: Subject to any disclaimer, the term of this patent is extended or adjusted under 35 U.S.C. 154(b) by 174 days.

(21) Appl. No.: 17/157,056

(22) Filed: Jan. 25, 2021

(65) Prior Publication Data

US 2021/0232820 A1    Jul. 29, 2021

Related U.S. Application Data

(60) Provisional application No. 62/965,207, filed on Jan. 24, 2020.

(51) Int. Cl.
*G06V 20/20*   (2022.01)
*E04H 1/12*    (2006.01)
*G06V 20/52*   (2022.01)

(52) U.S. Cl.
CPC .......... *G06V 20/20* (2022.01); *E04H 1/1205* (2013.01); *G06V 20/52* (2022.01)

(58) Field of Classification Search
CPC .............................. G06V 20/52; E04H 1/1222
See application file for complete search history.

(56) References Cited

U.S. PATENT DOCUMENTS

| | | | |
|---|---|---|---|
| 9,116,553 B2* | 8/2015 | Hanina | G06F 3/0304 |
| 10,148,918 B1 | 12/2018 | Seiger et al. | |
| 2006/0071135 A1* | 4/2006 | Trovato | A61B 90/37 |
| | | | 248/289.11 |
| 2008/0100707 A1 | 5/2008 | Brown | |
| 2013/0215275 A1* | 8/2013 | Berini | G06V 10/993 |
| | | | 348/150 |
| 2013/0229535 A1* | 9/2013 | Nakamura | H04N 23/00 |
| | | | 348/207.1 |
| 2016/0127710 A1* | 5/2016 | Saban | H04N 5/2624 |
| | | | 386/241 |

(Continued)

FOREIGN PATENT DOCUMENTS

| | | | |
|---|---|---|---|
| JP | 2008537825 A | 9/2008 | |
| JP | 2016040742 A | 3/2016 | |

(Continued)

OTHER PUBLICATIONS

International Preliminary Report on Patentability in PCT/US2021/014878 mailed on Aug. 4, 2022.

(Continued)

*Primary Examiner* — Kenny A Cese
(74) *Attorney, Agent, or Firm* — Schmeiser, Olsen & Watts LLP

(57) ABSTRACT

An apparatus comprises a kiosk and one or more computer-vision-based object tracking modules connected to the kiosk, each module comprising a camera and a processor configured to register and track objects within a field of view of the camera of that module.

14 Claims, 21 Drawing Sheets

(56) References Cited

U.S. PATENT DOCUMENTS

| | | | |
|---|---|---|---|
| 2017/0193727 A1* | 7/2017 | Van Horn | G06K 7/015 |
| 2018/0068266 A1 | 3/2018 | Kirmani et al. | |
| 2018/0189551 A1 | 7/2018 | Ranganath et al. | |
| 2018/0197139 A1* | 7/2018 | Hill | G06Q 10/0838 |
| 2019/0378205 A1 | 12/2019 | Glaser et al. | |
| 2020/0065757 A1* | 2/2020 | Lee | G06Q 10/087 |
| 2020/0118368 A1* | 4/2020 | Tagawa | G07C 9/257 |
| 2020/0228697 A1 | 7/2020 | Martel et al. | |
| 2020/0311953 A1* | 10/2020 | Olshansky | G03B 15/00 |
| 2020/0320653 A1* | 10/2020 | Hastings | G01V 5/20 |
| 2020/0394436 A1* | 12/2020 | Rakshit | G06F 18/24 |
| 2022/0058384 A1* | 2/2022 | Albines | G07G 1/0036 |

FOREIGN PATENT DOCUMENTS

| | | | |
|---|---|---|---|
| JP | 2016224734 A | 12/2016 | |
| JP | 2017521897 A | 8/2017 | |
| JP | 2017171443 A | 9/2017 | |
| JP | 2017187821 A | 10/2017 | |
| JP | 2017197369 A | 11/2017 | |
| JP | 2018116525 A | 7/2018 | |
| WO | 0163518 A2 | 8/2001 | |
| WO | WO-2020124244 A1 * | 6/2020 | G06K 7/1413 |

OTHER PUBLICATIONS

Prosecution History, including Office Actions, from U.S. Appl. No. 16/740,679, filed Jan. 13, 2020.
Prosecution History, including Office Actions, from U.S. Appl. No. 15/270,749, filed Sep. 20, 2016.
Prosecution History, including Office Actions, from U.S. Appl. No. 15/861,414, filed Jan. 3, 2018.
Prosecution History, including Office Actions, from U.S. Appl. No. 15/259,474, filed Sep. 8, 2016.
International Search Report and Written Opinion in PCT/US21/14878 mailed on Apr. 6, 2021.
Extended European Search Report in EP Application No. 21745084.0, mailed on Mar. 13, 2024.
First Office Action in Japanese Patent Application No. 2022-541906 mailed on Mar. 4, 2025.
Office Action in Japanese Patent Application No. 2022-541906 mailed on Sep. 3, 2025.

* cited by examiner

KIOSK WITH OBJECT IDENTIFICATION, REGISTRATION, AND TRACKING CAPABILITIES WITH LIGHT AND/OR AUDIO GUIDANCE

RELATED APPLICATIONS

This application claims priority to U.S. provisional application No. 62/965,207, filed Jan. 24, 2020 and entitled "Kiosk with Object Identification, Registration, and Tracking Capabilities with Light and/or Audio Guidance," the entirety of which is incorporated by reference herein.

FIELD OF THE INVENTION

The invention relates generally to object tracking. More particularly, the invention relates to a kiosk with object identification, registration, and tracking capabilities with light and/or audio Guidance.

SUMMARY

In one aspect, an apparatus comprises a kiosk; and one or more computer-vision-based object tracking modules connected to the kiosk, each module comprising a camera and a processor configured to register and track objects within a field of view of the camera of that module.

In another aspect, an apparatus comprises a kiosk including a computing system with a display screen disposed atop a pedestal; and one or more computer-vision-based object tracking and guidance modules connected to the kiosk, each module including a camera assembly including an image sensor that captures images within its field of view, and a lighting assembly housing one or more light sources, the camera assembly to acquire the images captured by the image sensor and with the lighting assembly to control operation of the one or more light sources, and one or more processors configured to acquire information about an object, to associate a location within the field of view of the image sensor with the object, to illuminate light emitted by the directional light source at the location associated with the object by rotating the lighting assembly and turning the laser assembly, and, based on an image acquired from the camera assembly, to detect change within the field of view of the image sensor corresponding to placement or removal of the object. In some embodiments, a control board assembly houses control boards that are in electrical communication with the kiosk to receive object identification information therefrom. The processors are part of the control boards.

In another aspect, a kiosk that tracks objects comprises a camera that performs a computer vision tracking of objects within a field of view; and an apparatus providing light guidance through either projection, through a projector or laser apparatus that shines a light on the targeted object, or task lighting that notifies the user whether the kiosk is operating correctly.

In some embodiments, the kiosk includes a means to track objects by a camera performing computer vision tracking of objects within the cameras field of view. The kiosk also has the capability to provide light guidance through either projection, through a projector or laser apparatus that shines a light on the targeted object(s), or task lighting that notifies the user that they are operating the kiosk correctly or incorrectly. For example, green stationary task light on the kiosk can refer to a successful task, red light can refer to an incorrect operation, or, in other embodiments, both types of lighting.

DETAILED DESCRIPTION

Apparatuses described herein have one or more computer-vision-based object tracking and guidance modules (hereafter, module) mounted to a kiosk and situated in front of shelving. From that position, each module can register and track the identity and position of objects within a module's field of view and, additionally or alternatively, guide users to specific objects using light, audio, or both. In brief overview, the module is comprised of a computer-vision system connected to and controlling a guidance system. The computer-vision system includes an image sensor, a depth sensor, or both, connected to a data processing unit capable of executing image-processing algorithms. The guidance system contains a directional light source and a mechanical and/or electrical system for the operation and orienting of the directional light source or audio system. Embodiments of the modules are described in U.S. patent application Ser. No. 16/740,679, filed Jan. 13, 2020, titled "Computer-vision-based Object Tracking and Guidance Module," the entirety of which application is incorporated herein. Example uses of the module are described in U.S. Pat. No. 10,148,918, issued Dec. 4, 2018, in U.S. application Ser. No. 15/861,414, U.S. Pat. Pub. No. US20180197139, published Jul. 12, 2018, and in U.S. application Ser. No. 15/259,474, U.S. Pat. Pub. No. US20180068266, published Mar. 8, 2018, the entirety of which U.S. Patent and U.S. published patent applications are incorporated by reference herein for all purposes.

The kiosk includes the hardware required to operate the computer-vision and guidance systems and requires power and data to be supplied by way of a 120v power cable and an Ethernet connection, and/or other wiring to the one or more modules, which passes through the interior of a post (also referred to as a pole, boom, mast, or beam) and exits an opening at the elevated end. The system can hold one or more modules to expand the monitored area. The kiosk can have a height adjustment feature, such as an adjustable post for raising and lowering the module(s), and for housing the wiring internally, providing a secure and sleek finished installation.

Accordingly, a free-standing object-tracking station that includes the kiosk integrated with one or more computer-vision-based object tracking modules, either by post or directly to the surface of the kiosk, permits the station to be mobile such that the entire station can be moved to different locations without the need of disassembling and reassembling the module(s) from the kiosk.

Figure 1:
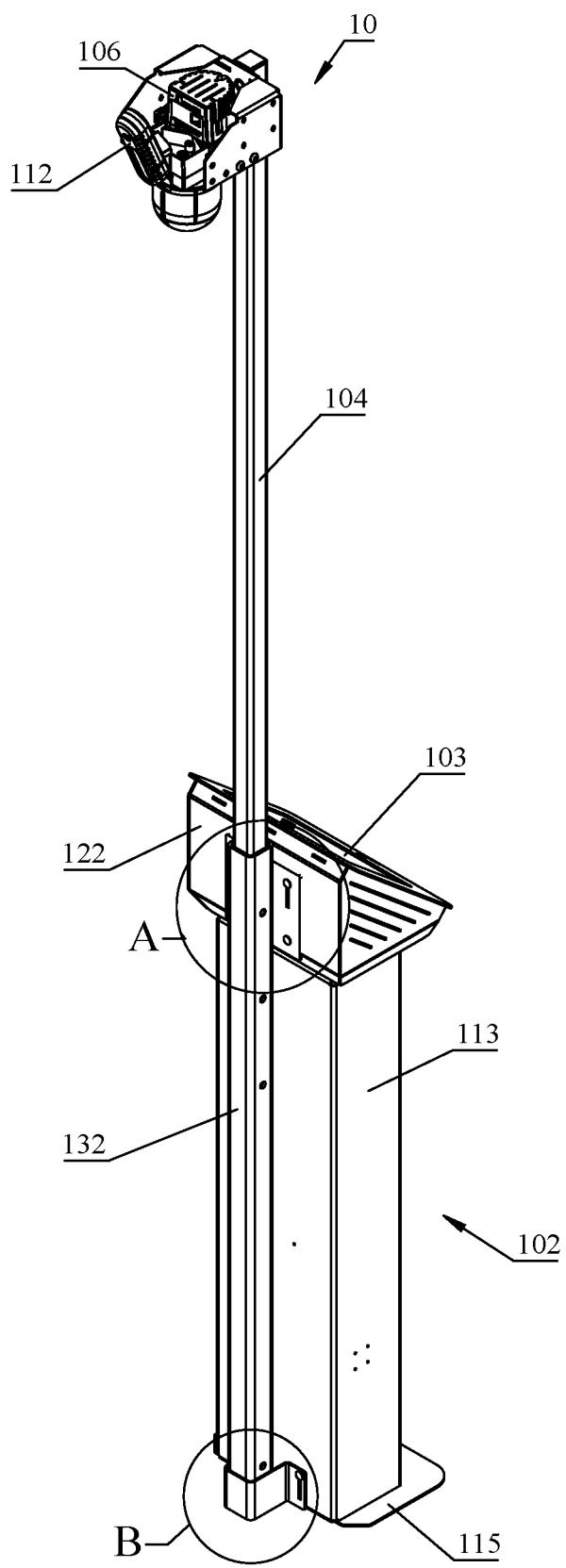
FIG. 1 is a perspective view of an object-tracking station, in accordance with some embodiments.

FIG. 1 shows an embodiment of a free-standing object-tracking station (hereafter, station) 10 including a kiosk 102 with a post 104 attached vertically to the kiosk 102, for example, a rear side but not limited thereto, and one computer-vision-based object tracking module 106 mounted to the elevated end of the post 104. In some embodiments, the object tracking module 106 has light and/or audio guidance capabilities. The object tracking module 106 may include a small form factor multi-axis gimbal that provides azimuth and elevation angle ranges positioning of an optional light projector, such as a laser pointer or other light source. For example, an azimuth angle range may be 58 degrees+/−1.5 degrees and an elevation angle range may be 131 degrees+/−1.5 degrees A camera 112 (i.e., an image sensor and/or a depth sensor) of the module 106 faces away from the rear of the kiosk 102. The kiosk 102 includes an interactive computing device 103 with a display screen disposed atop a pedestal 113. In some embodiments, the interactive computing device 103 includes a touch screen, but can alternatively be a tablet or the like with onboard computing devices. In other embodiments, interactive computing device 103 is a touch screen only, wired to a separate computing device. In some embodiments, the module 106 may include a calibration system comprising a combination of hardware and software that performs a calibration step with respect to the camera 112, for example, to determine background information both for 2D optical images and depth sensing. During operation, a calibration operation may be performed to limit a data set for analysis to a particular region near the kiosk 102, for example, when the station 10 is positioned near shelves where objects of interest (e.g., packages) are to be delivered and/or removed.

In some embodiments, the post 104 is non-adjustable where a portion of the post 104, e.g., midsection of the post 104, is secured to a rear side of an enclosure 122 of the computing device 103. In some embodiments, the post 104 is adjustable; the height of the module 106 at the top end of the post 104 can be raised and lowered to a desired height. In some embodiments, the post 104 includes two portions: a lower post 132 that is attached to the kiosk 102 and an upper post 104 that enters and slides within the lower post 132, for example, in a telescoping manner as shown. In some embodiments, the post 104 includes more than two telescoping portions, for example, a middle section between the upper 104 and lower post 132. In other embodiments, the post 104 is secured to the left and/or right sides of the kiosk 102. In still another embodiment, the post 104 is a single piece of a fixed length (i.e., height). In still another embodiment, the post 104 includes a unitary, one-piece linear configuration, which can be adjusted in height relative to the kiosk 102 by including multiple sets of mounting holes on the pedestal 113 to achieve the adjustability.

Figure 2:
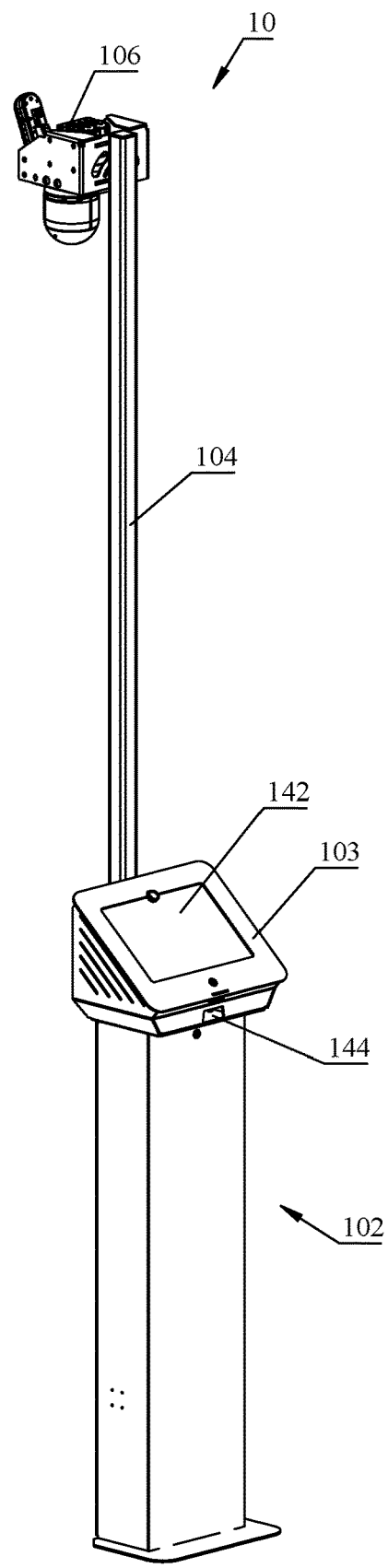
FIG. 2 is another perspective view of an object-tracking station, in accordance with some embodiments.

FIG. 2 shows an isometric view of the front of the station 10. In some embodiments, the computing device 103 of the kiosk 102 has a display screen 142, but is not limited thereto. Below is a scanner 144 for reading barcodes, QR codes, or other labeling information from an item or object. The height of a single module 106 mounted to the post 104 can be adjusted, for example, in pre-configured increments above the level of the ground. In some embodiments, there is also a predetermined height position to facilitate manual servicing.

Figure 3:
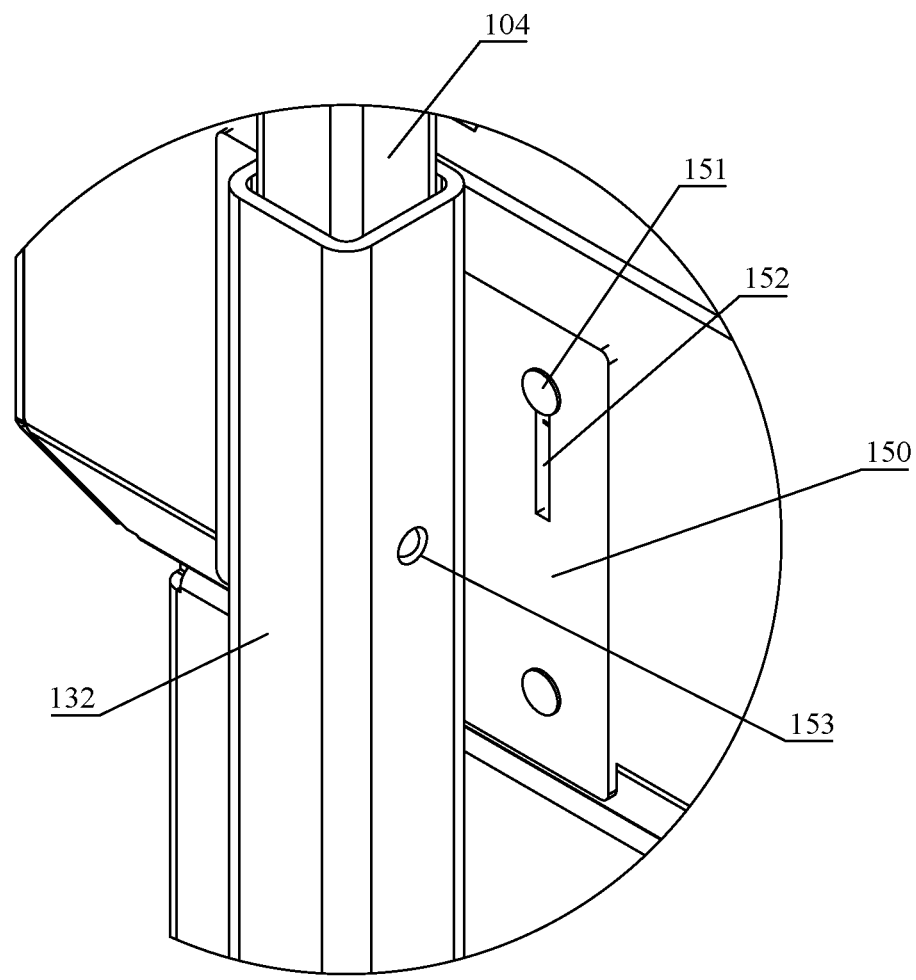
FIG. 3 is a closeup view of a boom mount bracket of the object-tracking station of FIGS. 1 and 2.

FIG. 3 shows the region within circle A in FIG. 1, which includes a lower post bracket, which in turn incudes a mount plate 150 and one or more carriage bolts 151 that secure the lower post bracket 150 to the kiosk 102. In some embodiments, the lower post 132 is part of the bracket 150. Mount plate 150 may include a slot 152 that prevents any manufacturing tolerances from affecting the final assembly. A single circular hole 153 in the lower post 132 is used to adjust the height of the post 104, and therefore the module 106, by using a button pin (not shown) or the like that passes through this circular hole 153 and into an upper post hole (not shown) that is aligned with this circular hole 153. On the opposite side of this bracket 150 is a second slot and carriage bolt (not shown). After removing the carriage bolts, the entire lower post 132 can be raised relative to the kiosk assembly 102 for the purpose of running a conduit or other wiring, such as an Ethernet cable for electronic communication with the kiosk 102 from a mounted module 106 to the switch mounted within the kiosk 102. In particular, this wiring can extend from the one or more modules and pass through the interior of the post 104 and exit an opening at an elevated end. In some embodiments, there are four thru-holes in the lower post section 132 that correspond to the desired mounting heights. The button pin is mounted within the upper post section 104.

Figure 4:
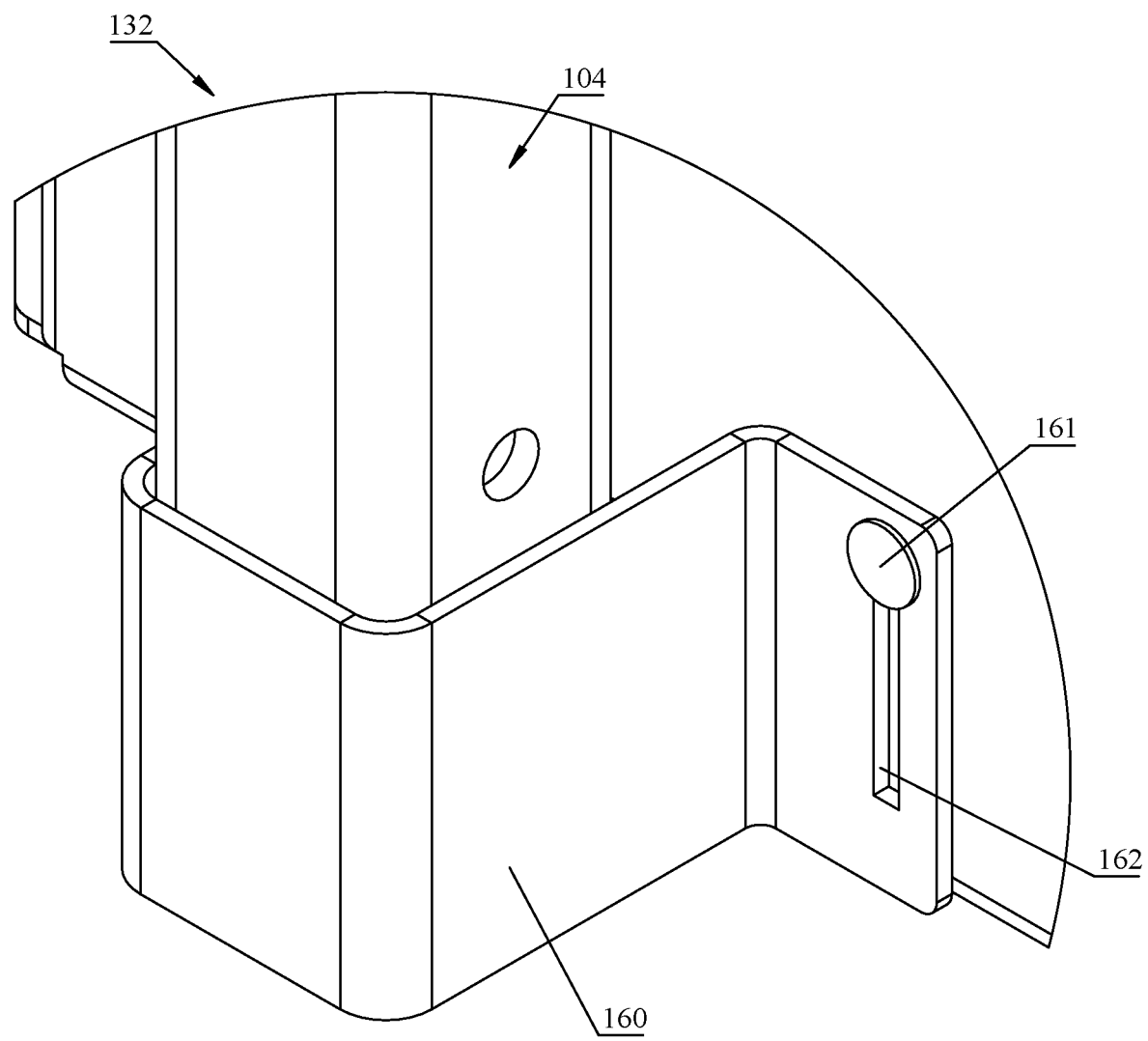
FIG. 4 is a closeup view of another boom mount bracket of the object-tracking station of FIGS. 1 and 2.

FIG. 4 shows the region within circle B in FIG. 1, which includes a second lower post bracket 160 used to hold the post 104 in place at the bottom of the kiosk pedestal 115. More specifically, the second lower post bracket 160 is positioned about the lower post 132, and in some cases, the upper post portion 104 is positioned in the lower post 132 at the bracket 160. A carriage bolt 161 or other coupling mechanism can pass through a slot 162 into the pedestal. On the opposite side of this bracket is a second slot and carriage bolt (not shown). When secured to the base 115 of the pedestal, the bracket 160 can abut the floor where the kiosk 102 stands.

Figure 5:
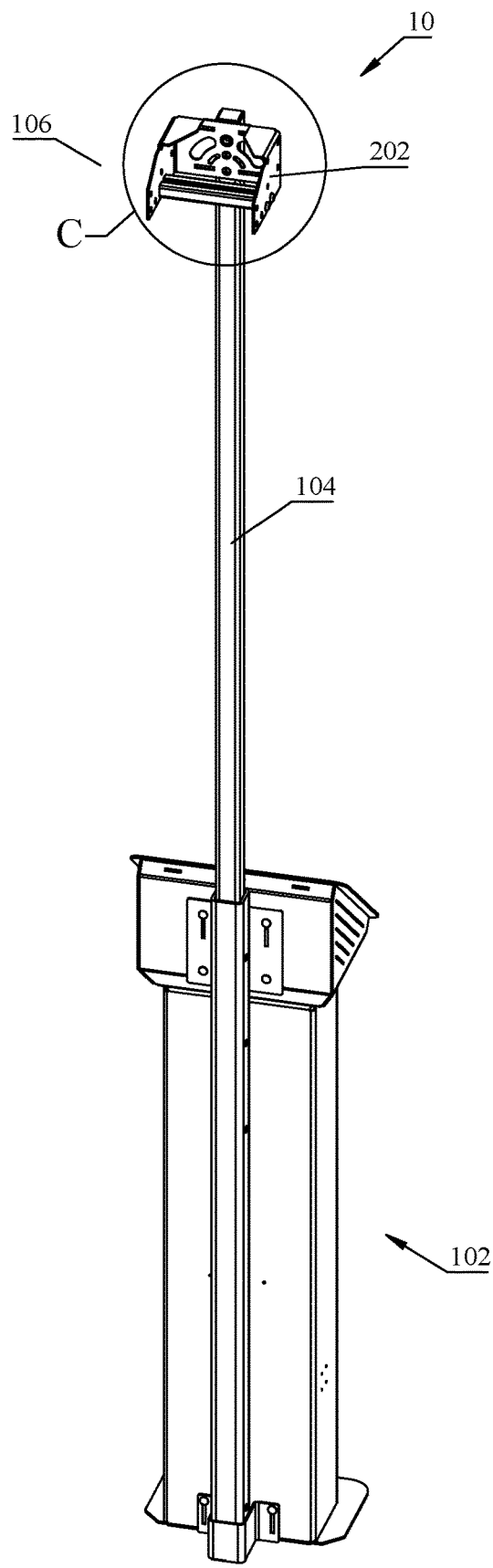
FIG. 5 is a rear view of an object-tracking station having a single module mount bracket mounted to the elevated end of the boom, in accordance with some embodiments.

FIG. 5 shows the rear side of an embodiment of the station 10 having a single module mount bracket 202 mounted to the elevated end of the post 104. The object-tracking and guidance module is omitted from the figure to show the module mount bracket 202. In some embodiments, the upper post portion 104 has four sides (generally square in cross-section). In other embodiments, some or all of the post 104 has a circular, curvilinear, or other geometric cross-section. In some embodiments, the mount bracket 202 is secured flush to the post 104 on a side of the post 104 opposite the kiosk.

Figure 6:
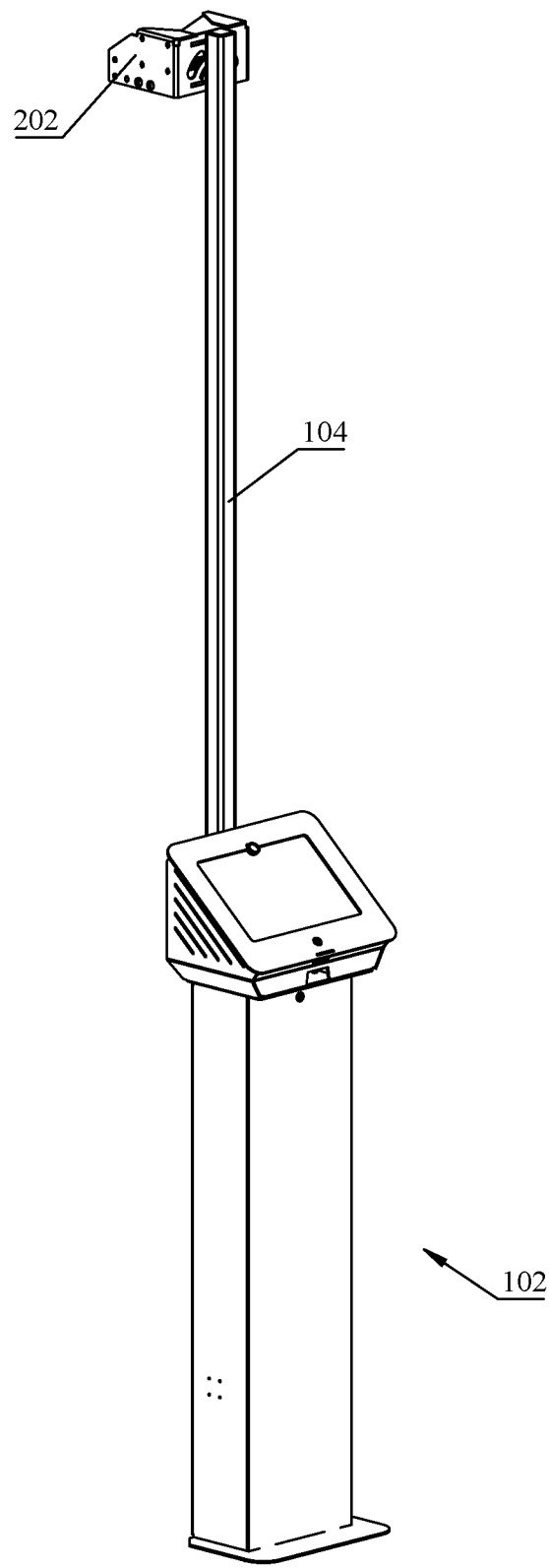
FIG. 6 is another perspective view of the object-tracking station of FIGS. 1-5.

FIG. 6 shows an isometric view of the front side of the station 10 with the single module mount bracket 202.

Figure 7:
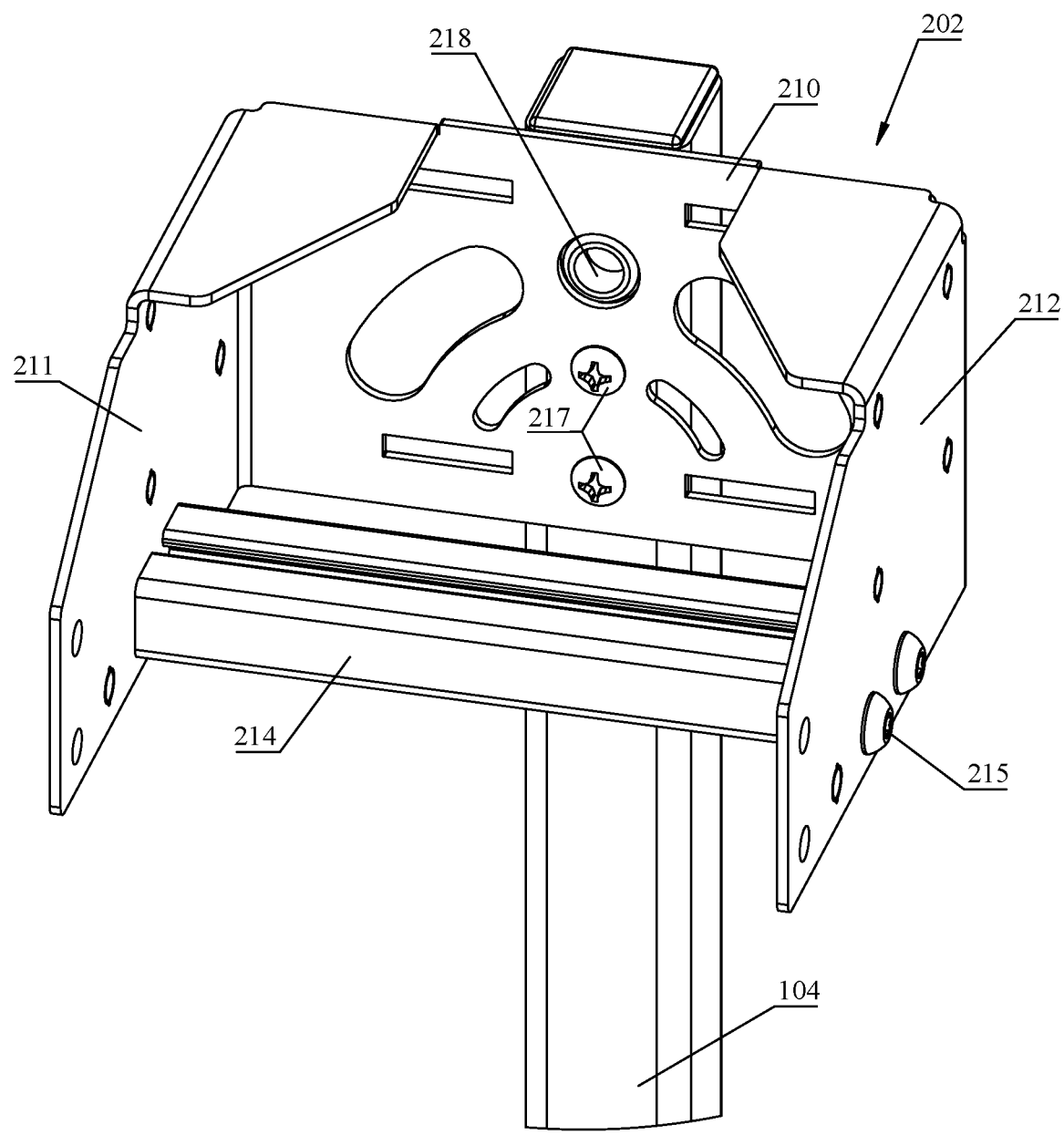
FIG. 7 is a closeup perspective view of a module mount bracket of the object-tracking station of FIG. 5.

FIG. 7 shows the detail view of the region within circle C in FIG. 5. The region includes the module bracket 202 having a mounting plate 210 disposed between opposing side walls 211, 212. A channel bar 214 is connected at both ends by fasteners 215 to these opposing side walls 211, 212. Two screws 217 pass through the mounting plate 210 into corresponding holes in the post 104. A grommet 218 passes through a top hole to protect the Ethernet cable or related conduit. The grommet 218 is installed in the upper post section 104 only. In some embodiments, the top hole of the angled bracket serves only as a clearance hole.

Figure 8:
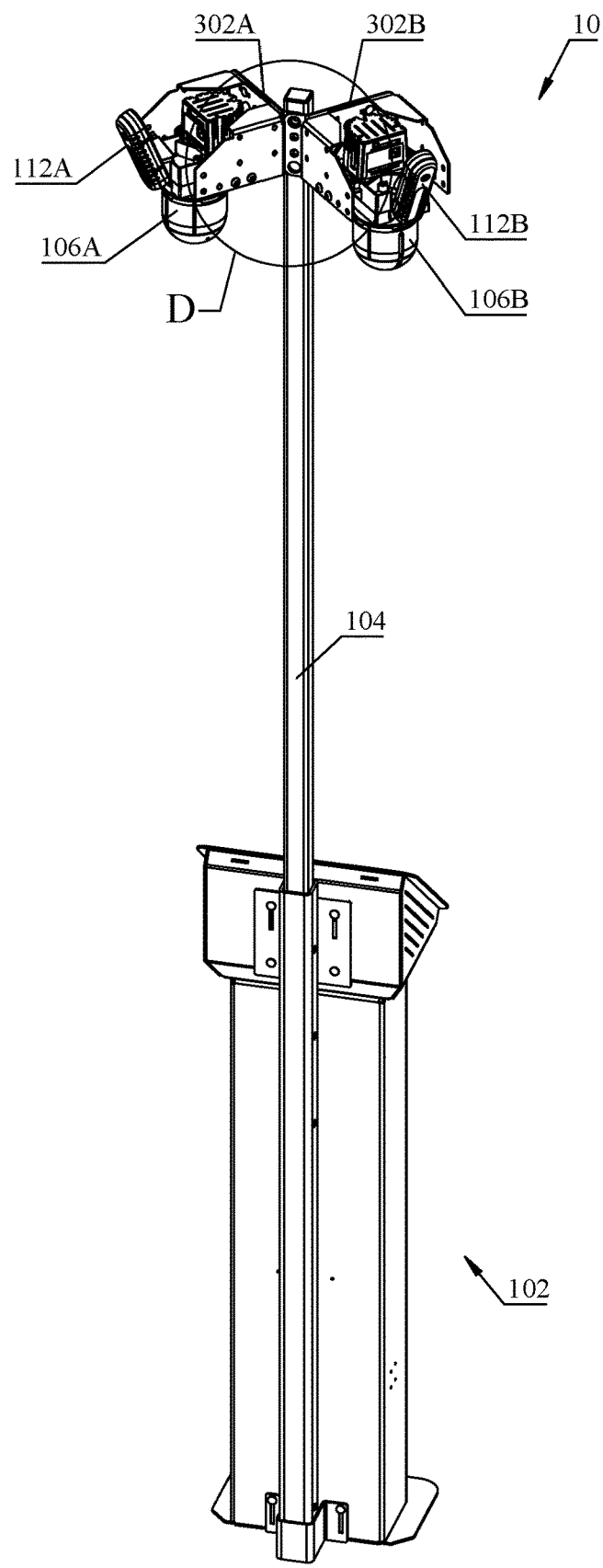
FIG. 8 is a perspective view of an object-tracking station with two modules mounted to the upper end of the boom, in accordance with some embodiments.

FIG. 8 shows an embodiment of a station 10 with two modules 106A, 106B mounted, using angle brackets 302A, 302B, to the upper end of the post 104. In some embodiments, the camera 112A, 112B of each module 106A, 106B, respectively, faces approximately 45 degrees from an imaginary line running through the post 104 perpendicular to the kiosk 102 (e.g., one camera 112A is −45 degrees; the other 112B is +45 degrees). In addition, the module 106 has built-in adjustability, using the camera 112 as a reference point, each camera 112A, 112B can be positioned anywhere from 20 to 70 degrees off the centerline of the kiosk 102. An angled bracket for any or all of the modules herein can mount the modules to the post at angles relative to each other offering up to a 360 degree tracking area.

Figure 9:
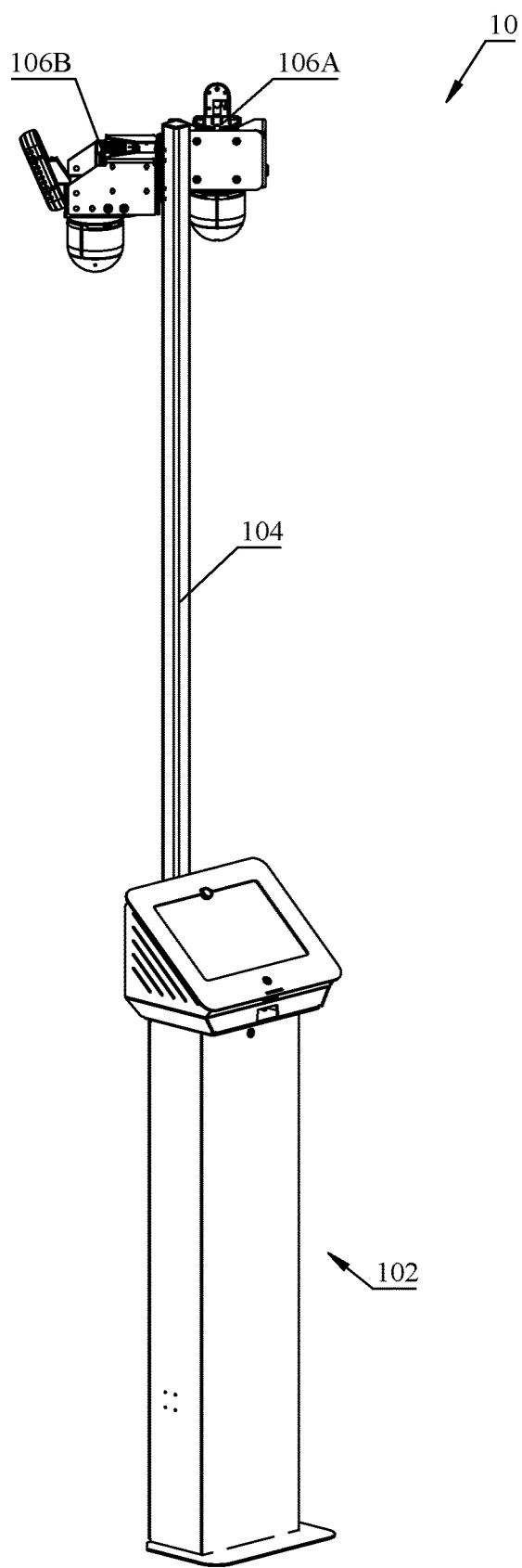
FIG. 9 is another perspective view of the object-tracking station of FIG. 8.

FIG. 9 shows the front of the station 10 of FIG. 8 with the two modules 106A, 106B mounted at predetermined angles, for example, 45 degrees but not limited thereto.

Figure 10:
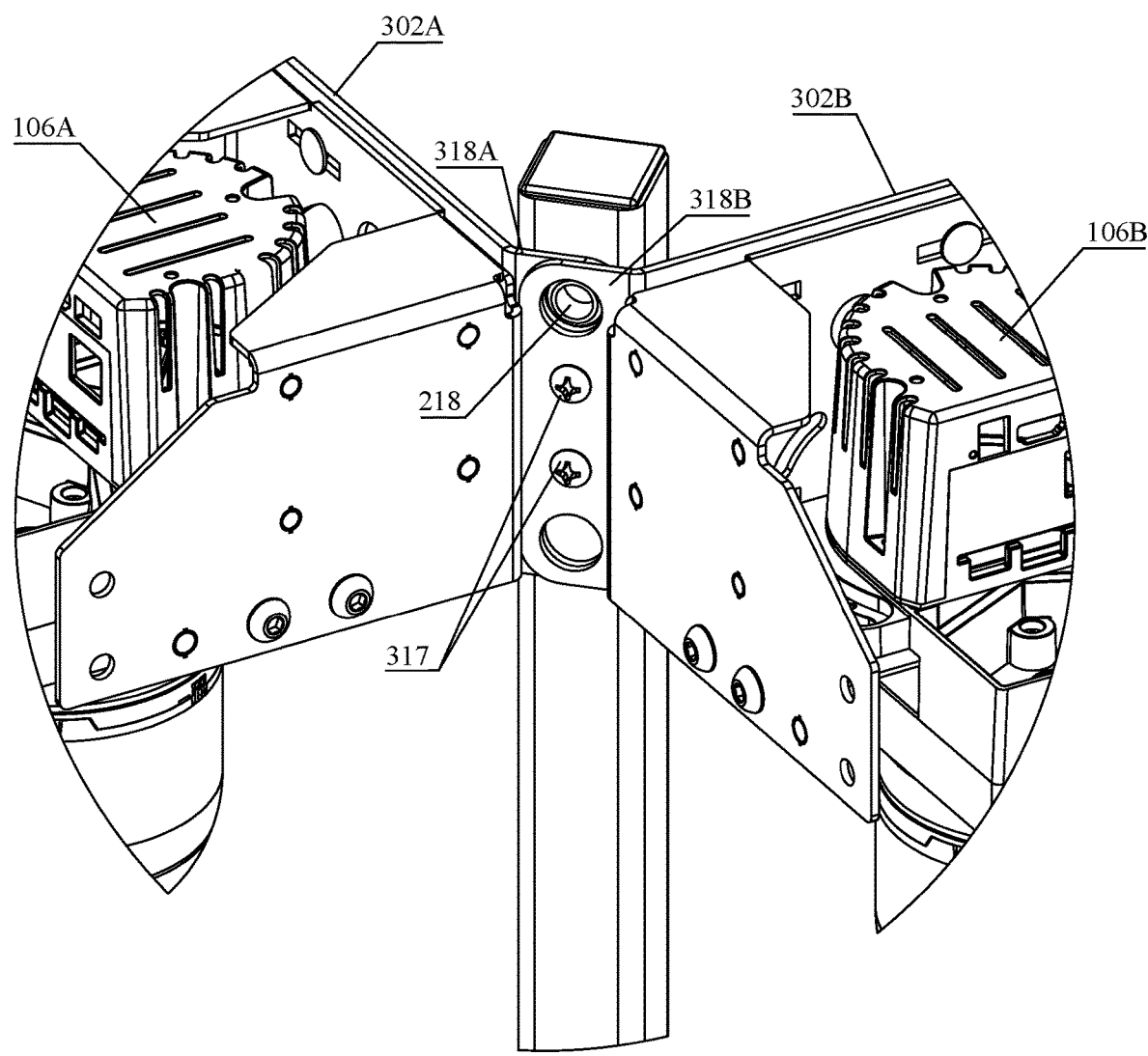
FIG. 10 is a closeup view of a module mount bracket with two modules of the object-tracking station of FIGS. 8 and 9.

FIG. 10 shows a detail view of the region within circle D in FIG. 8 where the two angle brackets 302A, 302B meet and are secured by two screws 317 to the same face of the post upright. A mounting flange 318B of one angle bracket 302B lies over the mounting flange 318A of the other angle bracket 302A. The two screws 317 pass through the mounting flanges 318A, 318B of both angle brackets. The grommet 218 in the top hole protects an Ethernet cable or the like that passes to the modules 106A, 106B. In some embodiments, the grommet 218 is installed in the upper post section 104 only; the top hole of the bracket serves only as a clearance hole.

Figure 11:
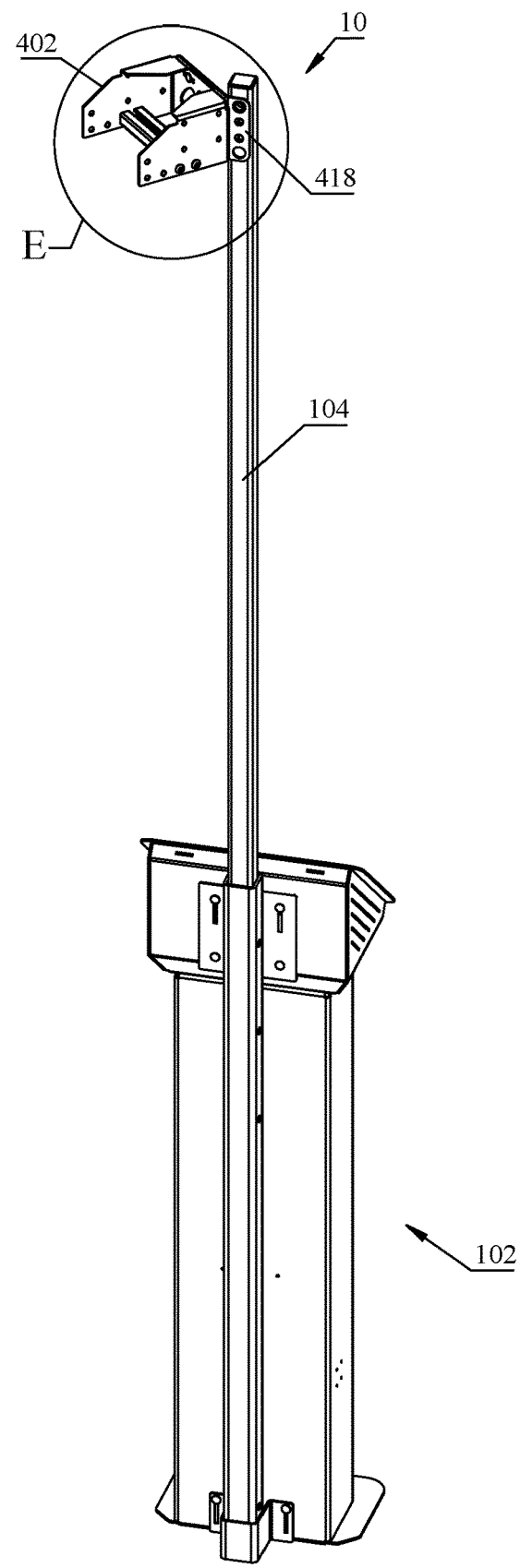
FIG. 11 is a perspective view of an object-tracking station with a single angle mount bracket facing away from the kiosk, in accordance with some embodiments.

FIG. 11 shows a station 10 with a single angle mount bracket 402, facing away from the kiosk at a 45-degree angle to the right.

Figure 12:
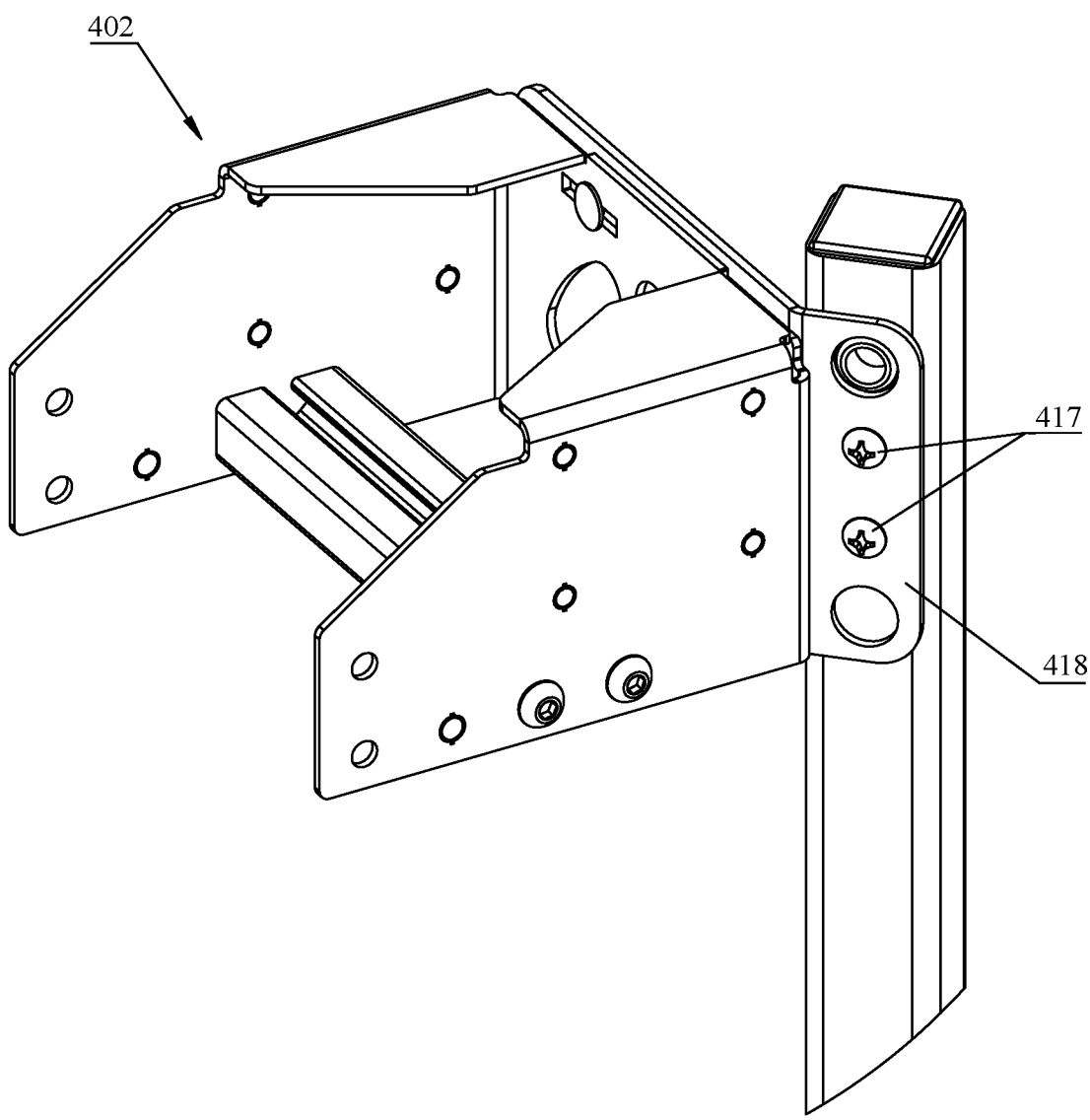
FIG. 12 is a closeup view of the angle mount bracket of FIG. 11.

FIG. 12 shows a detail view of the region within circle E in FIG. 11, including the single module mount bracket 402. The angle mount bracket 402 is similar to the bracket 202 shown in FIG. 7; a difference is that the angle mount bracket 402 has an additional angled mount flange 418 by which the bracket 402 is secured to the post 104. Angled mount flange 418 has two holes for bolts 417 and two grommet clearance holes (only one clearance hole is used at a time, based on the orientation of the bracket). In some embodiments, the bolts 417 are the same or similar to bolts 217 shown in FIG. 7 or bolts 317 shown in FIG. 10.

Figure 13:
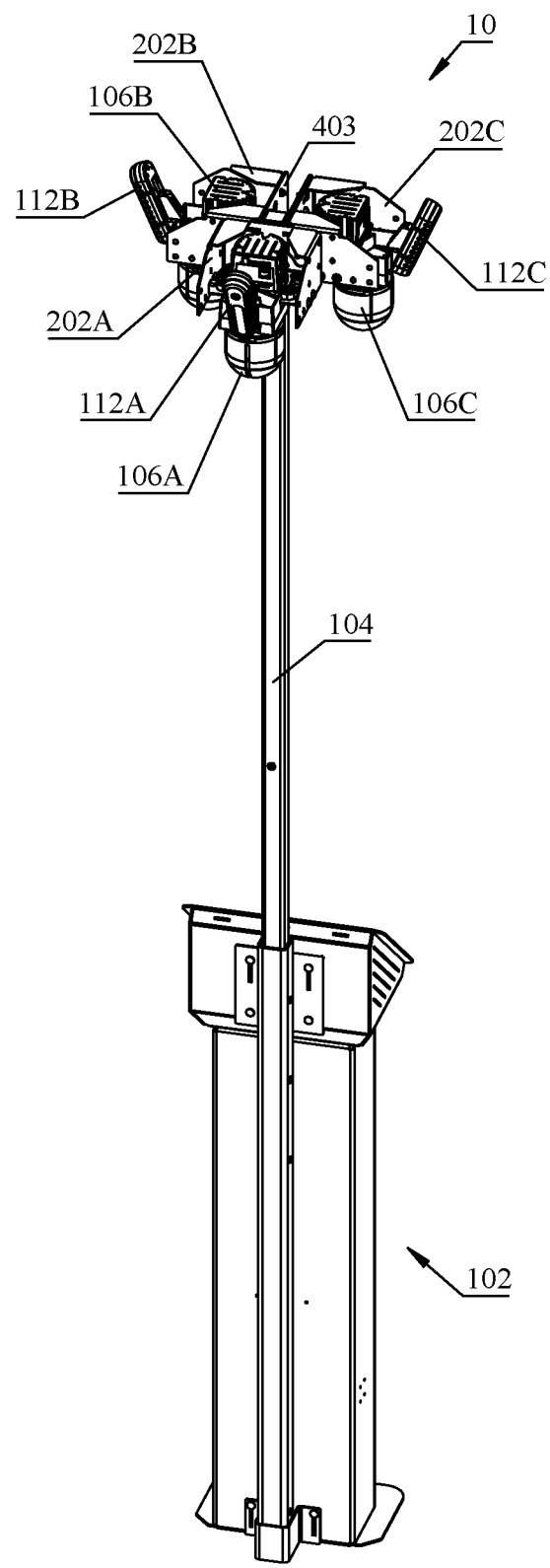
FIGS. 13 and 14 are perspective views of an object-tracking station with three modules mounted to the upper end of the boom, in accordance with some embodiments.
Figure 16:
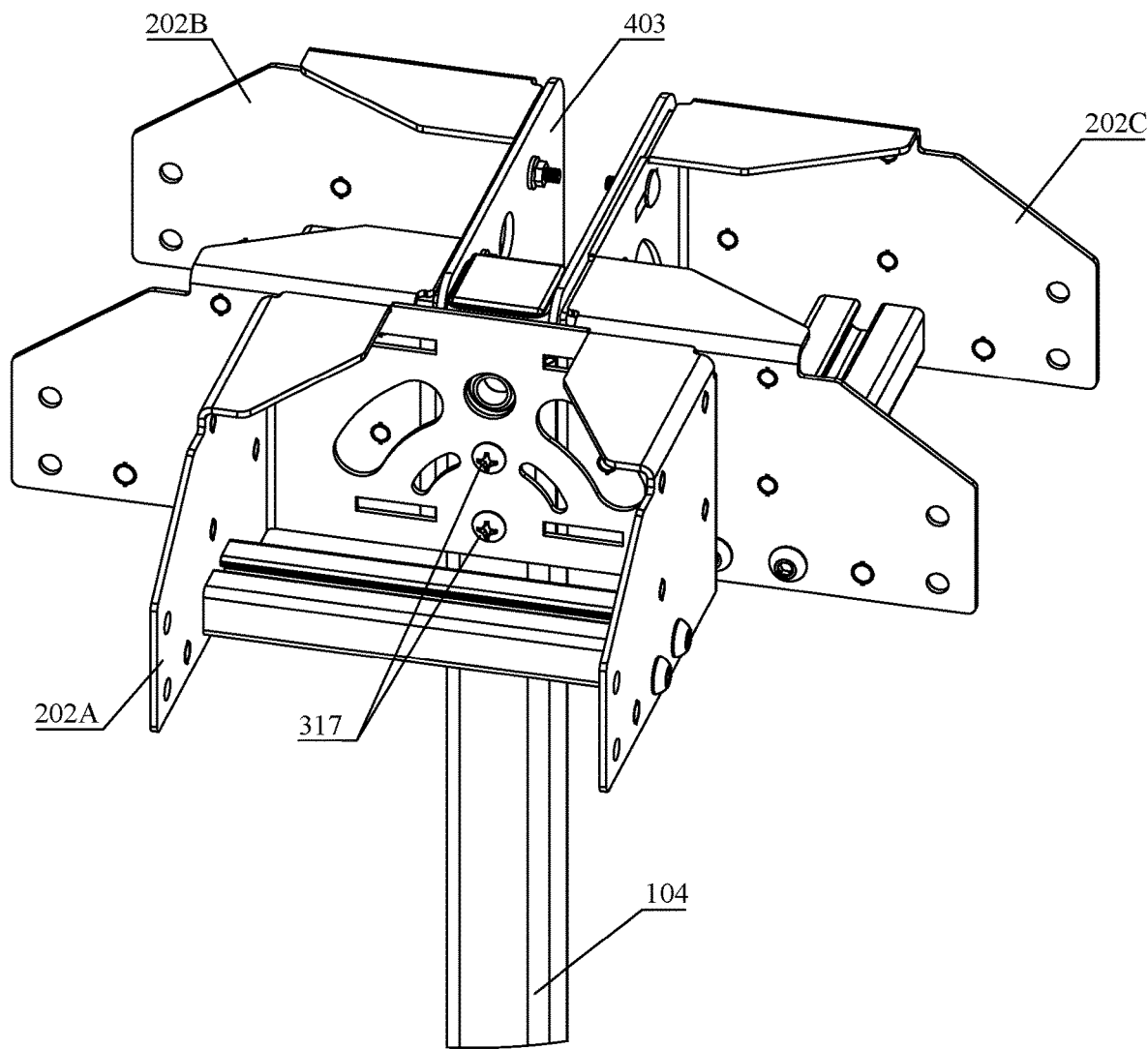
FIG. 16 is a closeup perspective view of a three-zone bracket of FIGS. 13-15.

FIG. 13 shows the rear side of a station 10 with three modules 106A, 106B, 106C mounted to three module mount brackets 202A, 202B, 202C of the type shown in FIG. 7, which are attached to a three-zone bracket 403 (see FIG. 16).

The three-zone bracket 403 is attached to the upper end of the post 104. The three modules 106A, 106B, 106C include a center module 106A flanked on one side by module 106B and on its other side by module 106C; the center module 106A is deemed that module with the camera 112A faces directly behind the kiosk 102. The cameras 112A-112C of the three modules 106A-106C face outward, away from the post 104. Considering the built-in adjustability, the camera 112C of the right module 106C faces away from the camera 112A of the center module 106A for example, by 65 to 115 degrees and the camera 112B of module 106B faces away from the camera 112A of the center module 106A, for example, by −65 to −115 degrees. The cameras 112B, 112C of the right and left modules may face directly away from each other (i.e., at 180 degrees). If both cameras 112B and 112C face forward; their brackets 202B, 202C are back to back, connected to opposite sides of the bracket 403. Again, using the camera as a reference point, each module has a built-in adjustability of +/−25 degrees.

Figure 14:
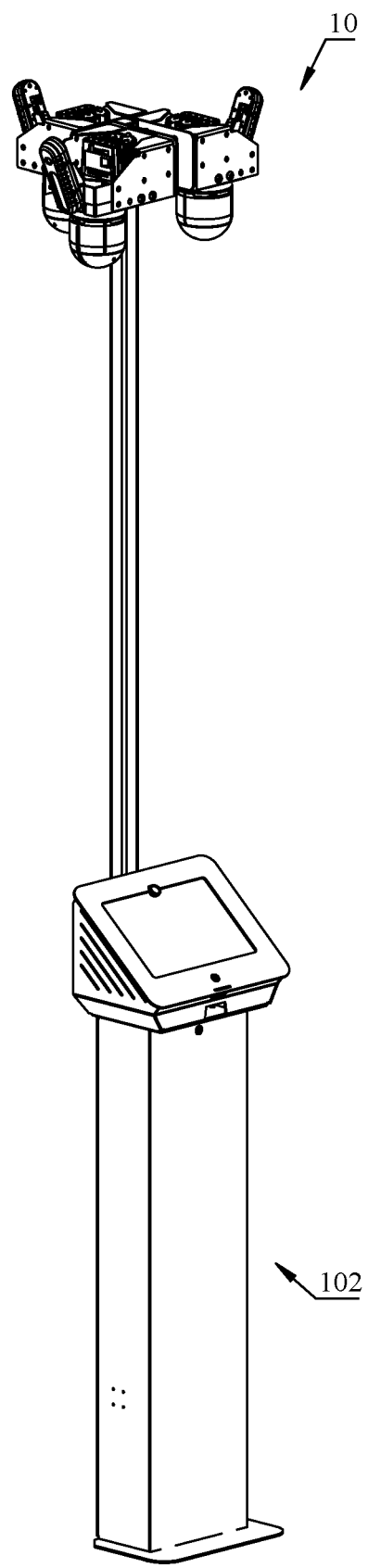

FIG. 14 shows a front isometric view of FIG. 13, the front side being that side of the kiosk 102 to be approached by a user of the computer vision and guidance systems of the station 10.

Figure 15:
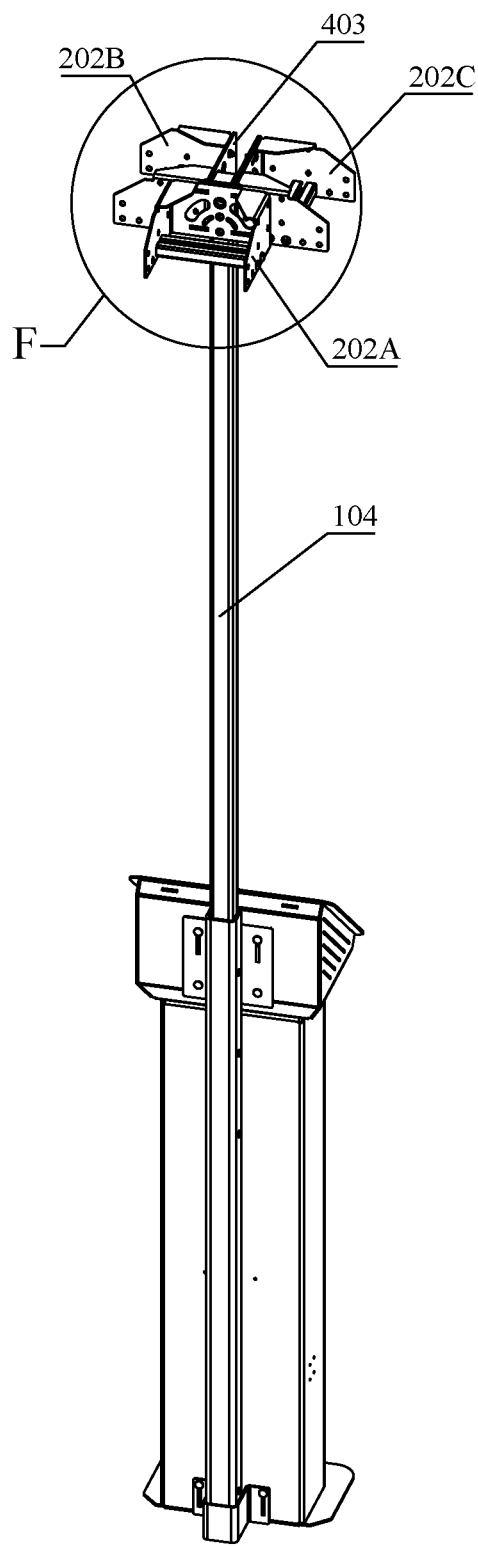
FIG. 15 is a perspective view of a three-zone bracket of FIGS. 13 and 14.

FIG. 15 shows the rear side of the station 10 of FIGS. 13 and 14 with the three-zone bracket 403 and the module mount brackets 202A, 202B, and 202C (without modules) mounted to the post 104.

FIG. 16 shows a detail view of the region within circle F in FIG. 15, including the three-zone bracket 403 and the module mount brackets 202A, 202B, and 202C (without modules) mounted to the post 104. The rear-facing 202A (i.e., center bracket) is mounted with the same two screws 317 that hold the three-zone bracket 403; each of the side brackets 202B and 202C is mounted with 4 carriage bolts and accompanying nuts.

Figure 17:
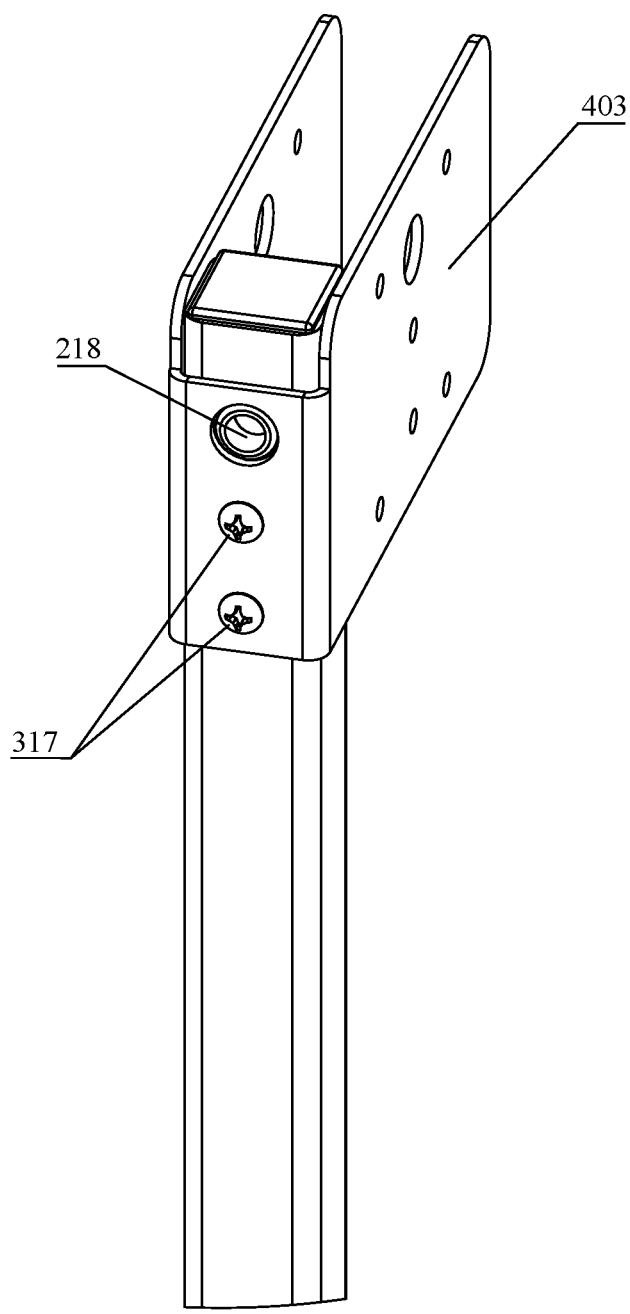
FIG. 17 is a closeup perspective view of a portion of the three-zone bracket of FIGS. 13-16.

FIG. 17 shows an embodiment of the three-zone bracket 403, mounted to one end of the vertical post 104, without the three modules mount brackets mounted to the bracket. The three-zone bracket 403 provides three individual mounting surfaces for brackets 202A-202C as shown in FIG. 16.

Figure 18:
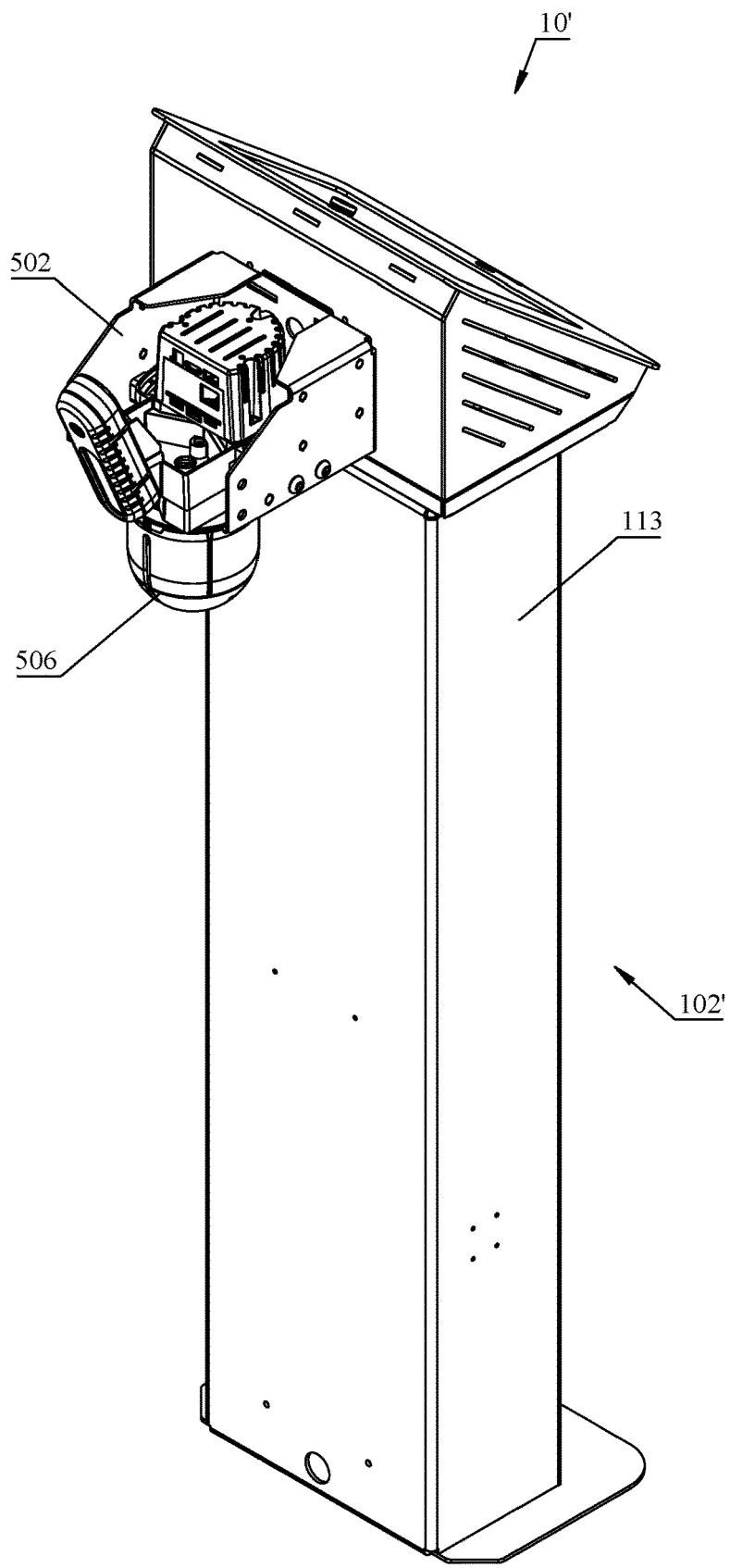
FIG. 18 is a perspective view of a computer-vision-based object tracking and guidance module integrated with and extending from a kiosk of an object-tracking station, in accordance with some embodiments.
Figure 19:
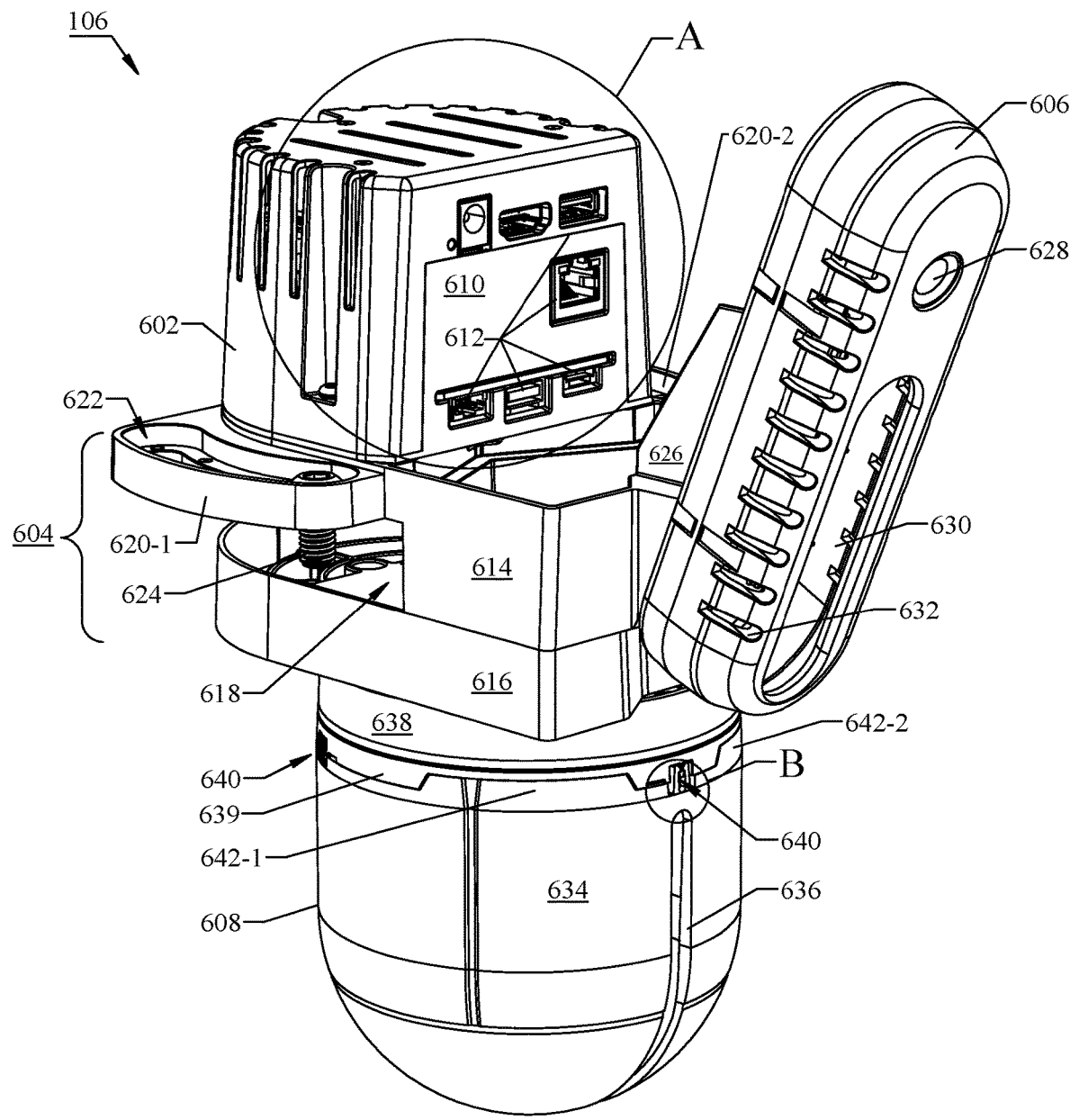
FIG. 19 is an isometric outward facing side view of an embodiment of a computer vision-based object tracking and guidance module, in accordance with some embodiments.

FIG. 18 shows a station 10' including a module 506 coupled to a bracket 502 and connected to the rear side of a kiosk 102'. The kiosk 102' is similar to or the same as a kiosk 102 in other embodiments herein except that the kiosk 102' has mechanical elements such as a coupling assembly, mounting plate, screws, and so on for receiving and coupling to the bracket 502. The bracket 502 and/or other elements shown in FIG. 18 can be similar to or the same as counterpart components of the kiosk 102. In some embodiments, the bracket 502 is welded, bonded, or otherwise integral with the rear surface of the kiosk 102'. In some embodiments, one or more computer-vision-based object tracking and guidance modules 506 extend directly from the kiosk 102' with no specific bracket 502. For example, as shown in FIG. 19, the computer vision-based object tracking and guidance module 106 may have a mounting flange 620 that directly couples to the rear wall of the kiosk 10'. Alternatively, the kiosk 10' may have a mounting element that extends from the kiosk 10' for coupling to one or more elements of the module 106 shown in FIG. 19. Accordingly, the module 506 may be similar to a module 106 described in FIGS. 1-17 and 19 but not limited thereto. The bracket 502 may be similar to a mounting bracket 202-402 described herein, except for the rear portion being constructed and arranged to directly couple to a rear surface of the kiosk 102', for example, behind the interactive computing device 103 with a display screen 142 disposed atop the kiosk pedestal 113. This embodiment illustrates an "all-in-one" kiosk can perform object identification, registration, tracking, and light and/or audio guidance without using a vertical mounting apparatus (i.e., boom, post) to hold the module. A gimble at a lower portion of the module 506 may be relied upon to direct a camera and/or other sensors in a desired direction to perform an object tracking operation. Depending on the construction of the kiosk 102', more than one module may be integrated with the kiosk, possibly at different heights and facing different directions, to monitor the same or different zones. For example, three modules 506 may be at the rear, left, and right surfaces of the kiosk 102', respectively. In some embodiments, the guidance module(s) can extend from the kiosk 10', or be coupled to and flush with a surface of the kiosk 10', or embedded within the kiosk wherein a gap is provided for the camera to view through.

FIG. 19 shows an isometric left-side view of an embodiment of a computer vision-based object tracking and guidance module 106. The module 106 includes a control board housing 602 connected to the top of a mount 604, a camera assembly 606 connected to the front side of the mount 604 or 626, and a lighting assembly 634 connected to housing 638, which is connected to a bottom of the mount 604 via a mount lower section 616. The control board housing 602 has a panel 610 with various electrical connectors 612 for communicating with the control electronics housed therein. The camera assembly 606 has an RGB camera 628 and a depth sensor 630 and side vents 632. The RGB camera 628 provides color information; The depth sensor 630 captures the depth map of the field of view of the sensor, which is stitched together with the color information to form a RGB-D map. The lighting assembly 634 has a dome-shaped cover 608 with a slit 636 frontally located. Directed light (e.g., laser) passes through this slit 636. In some embodiments, the lighting assembly 634 is rotatable. For example, a control board assembly houses control boards that are in electrical communication with the kiosk to receive object identification information therefrom. Here, the camera assembly can acquire images captured by the image sensor and with the lighting assembly to control operation of the one or more light sources. In some embodiments, the control board is separate from the camera and lighting assembly, and housed in a separate housing. The control boards can include one or more processors configured to acquire information about an object, to associate a location within the field of view of the image sensor with the object, and to point or otherwise illuminate light emitted by the directional light source at the location associated with the object by rotating the lighting assembly and turning the laser assembly, and, based on an image acquired from the camera assembly, to detect a change within the field of view of the image sensor corresponding to placement or removal of the object. In some embodiment, the control board is part of the kiosk and not part of a separate control board assembly.

The mount 604 has two joined sections: a mount upper section 614 and a mount lower section 616. The joined sections of the mount form a channel 618 that receives a rail. The mount upper section 614 has two mounting flanges 620-1, 620-2, one on each side of the section, each having an arcuate opening 622 through which a fastener extends to attach the module to a rail. The mount upper section 614 also has a raised arm 626 to which the camera assembly 606 is fastened. The slant of the raised arm 626 holds the camera assembly such that the camera and depth sensors point generally downwards.

As described above, a module 106 is constructed and arranged for deploying in a fixed position, near a support surface (e.g., shelving) in the object-holding area. When the module is mounted, the RGB camera and optional depth camera are adapted to face a target area of interest, for example, a supporting surface. Examples of the supporting surface include, but are not limited to, desktops, tables, shelves, and floor space. In general, the supporting surface is disposed in or at an object-holding area. The object-holding area can be a supermarket, warehouse, inventory, room, closet, hallway, cupboards, lockers, each with or without secured access. Examples of identified and tracked objects include, but are not limited to, packages, parcels, boxes, equipment, tools, food products, bottles, jars, and cans. (People may also be identified and tracked.) The RGB camera has a field of view (FOV) that covers a portion of or all the area occupied by the supporting surface; the field of view of an optional depth camera matches at least that of the RGB camera. Each separate camera, e.g., RGB 628 and depth cameras 630 as its own perspective of the area and of the objects placed on the supporting surface.

The data processing unit (within the control board housing) is also in communication with one or more light sources in the lighting assembly 634. The data processing unit may be configured to control the light source to provide light guidance to objects located on the supporting surface or to certain regions of the supporting surface, depending upon the object or region of interest.

Figure 20:
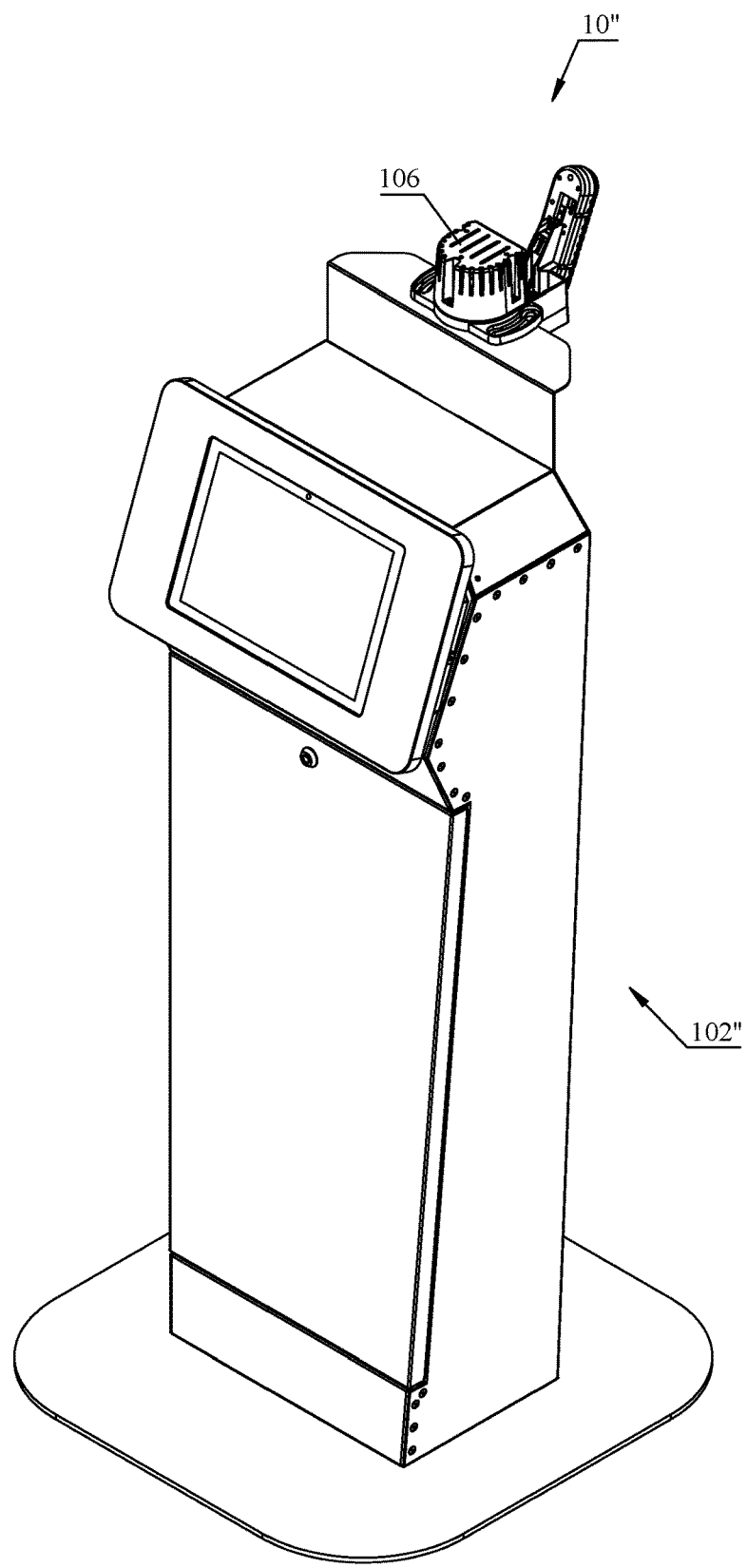
FIG. 20 is a front perspective view of a module connected to a top region of a kiosk, in accordance with some embodiments.

FIG. 20 is a front perspective view of an object tracking station 10" including a module 106 connected to a top region of a kiosk 102", in accordance with some embodiments.

Figure 21:
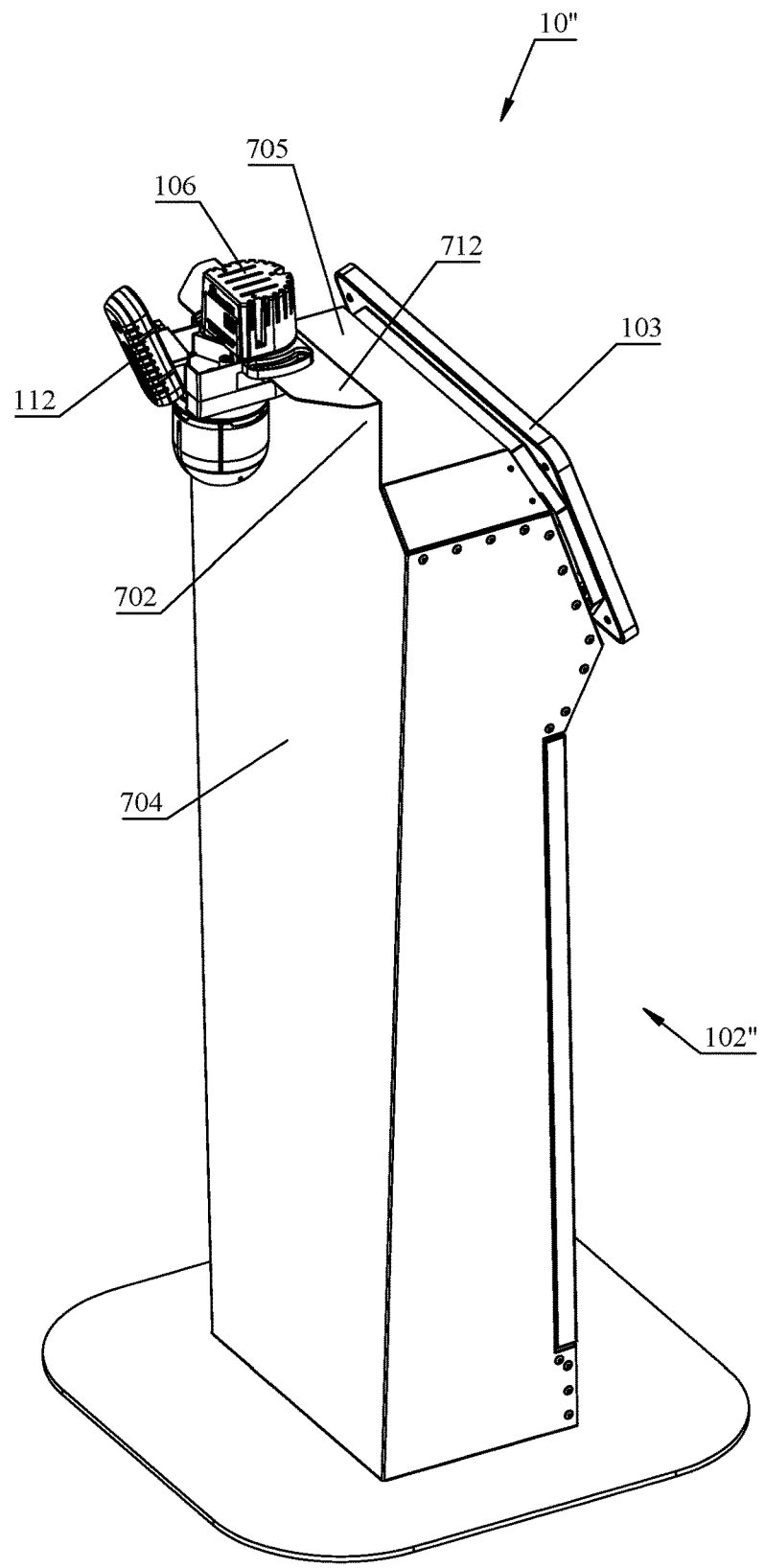
FIG. 21 is a rear perspective view of the object-tracking station of FIG. 20.

FIG. 21 is a rear perspective view of the object-tracking station 10" of FIG. 20. As shown, the kiosk 102" includes a kiosk extension 702 extending from a top region of the kiosk 102". The extension 702 can be integral with the kiosk 102", for example, unitary with a rear wall 704 of the kiosk and extending in a direction along a height of the kiosk, e.g., vertically, so that a top surface of the extension 702 is higher than a top surface 705 of the kiosk 102" The module 106 is directly coupled to the extension 702 such that the camera 112 and/or other relevant data-collecting components of the module 106 are facing a region behind the kiosk 102". In some embodiments, a top portion 712 extends tangentially from the extension 702, for example, away from the kiosk 102". The top portion 712 may have a slot, groove, opening, or the like for receiving and holding in place the module 106 such that the camera 112 is below the protruding top portion 712 to collect and process images in an unobstructed manner.

As will be appreciated by one skilled in the art, aspects of the present invention may be embodied as a system, method, and apparatus. Thus, some aspects of the present invention may be embodied entirely in hardware, entirely in software (including, but not limited to, firmware, program code, resident software, microcode), or in a combination of hardware and software.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. References to "one embodiment" or "an embodiment" or "another embodiment" means that a feature, structure or characteristic described in connection with the embodiment is included in at least one embodiment described herein. References to one embodiment within the specification do not necessarily all refer to the same embodiment. The features illustrated or described in connection with one exemplary embodiment may be combined with the features of other embodiments.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. Any references to front and back, left and right, top and bottom, upper and lower, and vertical and horizontal, and the like are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

What is claimed is:

1. An apparatus comprising:
   a computer having a console comprising a user interface;
   one or more computer-vision-based object tracking modules connected to the computer, each computer-vision-based object tracking module comprising a camera oriented to capture a target area within a field of view, and further comprising a processor configured to:
      detect, register, and track multiple objects located in or moving through the field of view of the camera;
      determine changes in a presence of one or more of the multiple objects in the field of view, including additions and removals;
      associate specific locations within the field of view of the camera with detected objects of the multiple objects;
      control one or more directional light sources to provide visual guidance indicating the location of one or more of the multiple objects that are detected, registered, and tracked; and
      calibrate the one or more computer-vision-based object tracking modules to identify the target area; and
   a controller in communication with the camera and a guidance system comprising the one or more directional light sources, the controller adapted to receive images within the field of view and detect a change within the field of view of the camera corresponding to a placement or removal of a tracked object of the multiple objects of the plurality of objects at an area captured by the images within the field of view, wherein the guidance system guides a user to the tracked object depending on whether the tracked object is within the field of view, to detect a change within the field of view of the image sensor corresponding to placement or removal of the tracked object.

2. The apparatus of claim 1, further comprising a post extending from the computer such that one end of the post is elevated higher than the computer, and wherein the one or more computer-vision-based object tracking modules are mounted on the post such that the at least one camera faces away from the console for tracking the object, wherein the post is adjustable in height.

3. The apparatus of claim 2, wherein the post includes first and second sections, one of the first and second sections sliding into the other of the first and second sections.

4. The apparatus of claim 2, wherein the computer is a kiosk that includes a computing device disposed on a pedestal, and the post is secured to the pedestal on a rear side of the kiosk.

5. The apparatus of claim 2, wherein the post is secured at one end to any one of the rear, top, or sides of the computer.

6. The apparatus of claim 2, wherein the one or more computer-vision-based object tracking modules comprises two or more modules mounted on the post.

7. The apparatus of claim 6, further comprising an angled bracket for each of the two or more modules, the angled brackets being used to mount the two or more modules to the post angles relative to each other up to a 360-degree tracking area.

8. The apparatus of claim 1, wherein the computer includes a data acquisition device for reading labeling information from an item or object.

9. The apparatus of claim 1, wherein the one or more computer-vision-based object tracking and guidance modules are integral with a rear surface of the computer.

10. The apparatus of claim 1, wherein the processor of the computer-vision-based object tracking module is configured to communicate with a remote guidance system for controlling the guidance system to guide the user to the objects depending on whether the objects are in the field of view.

11. The apparatus of claim 1, wherein the computer communicates with the controller to perform object identification, registration, tracking, and guidance operations.

12. The apparatus of claim 1, wherein the each computer-vision-based object tracking module performs multi-object tracking of the plurality of objects using the camera facing away from the console, and distinguishes the first location capturing a first object from the second location capturing a second object within the field of view.

13. The apparatus of claim 1, wherein the processor is further configured to perform a calibration operation to calibrate the one or more computer-vision-based object tracking modules to determine background information and limit a field of analysis to the target area in the field of view of the camera.

14. The apparatus of claim 1, wherein the one or more computer-vision-based object tracking modules are positioned on a multi-axis gimbal, and wherein the controller and the calibration system control the gimbal to direct the camera of the each computer-vision-based object tracking module to point at the target area.

* * * * *